United States Patent
Matsuya

(10) Patent No.: US 7,694,137 B2
(45) Date of Patent: Apr. 6, 2010

(54) IMAGE PROCESSING SYSTEM AND AUTHENTICATION METHOD OF THE SAME

(75) Inventor: Akihiro Matsuya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1084 days.

(21) Appl. No.: 10/646,797

(22) Filed: Aug. 25, 2003

(65) Prior Publication Data

US 2004/0054904 A1      Mar. 18, 2004

(30) Foreign Application Priority Data

Aug. 28, 2002   (JP)   ............................. 2002-249475

(51) Int. Cl.
*H04L 9/32*       (2006.01)
(52) U.S. Cl. .................... 713/168; 713/150; 726/2; 726/21; 726/26; 380/231
(58) Field of Classification Search .................. 713/168
See application file for complete search history.

(56) References Cited

U.S. PATENT DOCUMENTS

| | | | | |
|---|---|---|---|---|
| 6,085,249 | A * | 7/2000 | Wang et al. ............... | 709/229 |
| 6,105,131 | A * | 8/2000 | Carroll ...................... | 713/155 |
| 6,237,023 | B1 * | 5/2001 | Yoshimoto ................. | 709/203 |
| 6,378,070 | B1 * | 4/2002 | Chan et al. ................. | 713/155 |
| 6,938,154 | B1 * | 8/2005 | Berson et al. .............. | 713/156 |
| 7,117,493 | B2 * | 10/2006 | Matsushima ............... | 717/173 |
| 7,158,657 | B2 * | 1/2007 | Okazaki et al. ............ | 382/118 |
| 2002/0042880 | A1 * | 4/2002 | Endoh ....................... | 713/182 |
| 2003/0043416 | A1 * | 3/2003 | Rublee et al. .............. | 358/402 |
| 2003/0093670 | A1 * | 5/2003 | Matsubayashi et al. .... | 713/168 |
| 2003/0105849 | A1 * | 6/2003 | Iwamoto et al. ........... | 709/223 |
| 2003/0163730 | A1 * | 8/2003 | Roskind et al. ............ | 713/201 |
| 2003/0185151 | A1 * | 10/2003 | Kurosawa et al. .......... | 370/219 |
| 2004/0049684 | A1 * | 3/2004 | Nomura et al. ............ | 713/182 |

FOREIGN PATENT DOCUMENTS

| | | |
|---|---|---|
| JP | 9-171416 | 6/1997 |
| JP | 2001-222190 | 8/2001 |
| JP | 2001-326782 | 11/2001 |
| JP | 2002-7095 | 1/2002 |

(Continued)

OTHER PUBLICATIONS

Hiroki Eda et al. "PC ID Declaration Section Part Authentication through Inherent Numbers and Authentication Circuits", pp. 1-8.*

(Continued)

*Primary Examiner*—Matthew B Smithers
*Assistant Examiner*—Shewaye Gelagay
(74) *Attorney, Agent, or Firm*—Fitzpatrick, Cella, Harper & Scinto

(57) ABSTRACT

When a host computer connected to a network is to remotely control information in an image processing apparatus, authentication to the image processing apparatus is performed by using a password, and, on the basis of an encryption code of an encryption chip stored in the host computer, an authentication process for an operation with respect to the information in the image processing apparatus is performed by using a dictionary in an authentication server.

6 Claims, 15 Drawing Sheets

FOREIGN PATENT DOCUMENTS

JP          2002-215586        8/2002

OTHER PUBLICATIONS

Eda, H. et al., "PC ID Declaration Second Part Authentication Technology Reliable Identification of Individual Terminals through Inherent Numbers and Authentication Circuits", Nikkei Electronics, Japan, Nikkei BP Company, Domestic Tech. Magazine, Issue No. 740, pp. 105-113 (Apr. 5, 1999), (Partial English translation Included).

Ichikawa, H. et al., "Realization of a User Authenticity VLAN Client by a Signed Applet, Computer and Network LAN", Ohmsha Corporation, Japan, Domestic Technology Magazine 2002-01113-020, vol. 20, Issue 7, pp. 93-100 (Jul. 1, 2002) (Partial English translation included).

* cited by examiner

FIG. 12

| FOLDER | FILE NAME | SIZE (kb) | DATE |
|---|---|---|---|
| 1201 | 1202 | 1203 | 1204 |
| ☐ HDD | • BUSINESS RESULTS.txt | • 188 | • 2000/10/01 |
| ☐— MANAGER | • CLIENT LIST.txt | • 1,204 | • 2000/12/24 |
| ☐— PART 1 | • PRODUCT INFORMATION.txt | • 4,800 | • 2001/02/10 |
| ☐ SUZUKI | • ******.* | • *** | • *** |
| ☐ SAITO | 1205 | 1206 | |
| ☐— PART 2 | | | |
| ☐— PART 3 | | | |

IMAGE PROCESSING SYSTEM AND AUTHENTICATION METHOD OF THE SAME

FIELD OF THE INVENTION

The present invention relates to an image processing system in which a host computer and an image processing apparatus capable of processing information in the apparatus in accordance with remote control from the host computer are connected to a network, and an authentication method of the system.

BACKGROUND OF THE INVENTION

Presently, a multifunction digital copying machine called an MFP (Multi Function Peripheral) can perform copying, printing, scanning, and facsimile communication. In addition, scanned image data can be stored in an internal hard disk (HDD), and a host computer in a remote place can read and acquire the stored data and can also store data in the HDD.

When, however, a host computer in a remote place remotely controls an image processing apparatus such as an MFP, this host computer can read and acquire data in the apparatus by only simple password authentication. Therefore, there was possibility that the data might be read or acquired by other users who knew accidentally the password.

SUMMARY OF THE INVENTION

The present invention has been made in consideration of the above situation, and has as its object to strengthen the security when a host computer connected to a network remotely controls information in an image processing apparatus.

To achieve the above object, according to an aspect of the present invention, there is provided an authentication method of an image processing system in which a host computer, an authentication apparatus and an image processing apparatus are connected to a network. In a first request step, at the host computer, the image processing apparatus is requested to effect authentication when the host computer remotely operates the image processing apparatus. A transmission step is performed, in which, at the image processing apparatus, data specifying the authentication apparatus to perform an authentication process on an operation level of the remote operation is transmitted to the host computer in a case where the host computer is authenticated in response to the request in the first request step. In a second request step, at the host computer, a request for the authentication process is issued to the authentication apparatus based on the data transmitted in the transmission step, and in an authentication step, at the authentication apparatus, the authentication process is performed in response to the request in the second request step. A remote operation step is performed at the host computer, in which the image processing apparatus is remotely operated in accordance with the operation level authenticated in the authentication step.

Also, according to another aspect of the present invention, there is provided an image processing system in which a host computer, an authentication apparatus and an image processing apparatus are connected to a network, comprising: a first request unit which, at the host computer, issues a request to the image processing apparatus to effect authentication when the host computer remotely operates the image processing apparatus. A transmission unit, at the image processing apparatus, transmits data specifying the authentication apparatus to perform an authentication process on an operation level of the remote operation to the host computer in a case where the host computer is authenticated in response to the request from the first request unit. A second request unit, at the host computer, issues a request for the authentication process to the authentication apparatus based on the transmitted data, and an authentication unit, at the authentication apparatus, effects execution of the authentication process in response to the request from the second request unit. A remote operation unit, at the host computer, operates the image processing apparatus remotely in accordance with the operation level authenticated in the authentication unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a view showing a display example of data stored in the image processing apparatus 110;

DETAILED DESCRIPTION OF THE PREFERRED EMBODIMENT

A preferred embodiment of the present invention will now be described in detail in accordance with the accompanying drawings.

This embodiment will be explained by taking a multi function peripheral (MFP) as an example of an image processing apparatus. This MFP is connected to a network, has a plurality of functions such as a scanner function, printer function, and facsimile function, and can be used as a copying machine, printer, scanner, and facsimile apparatus by using one of these functions or combining the functions. However, the present invention is not limited to the MFP.

Figure 1:
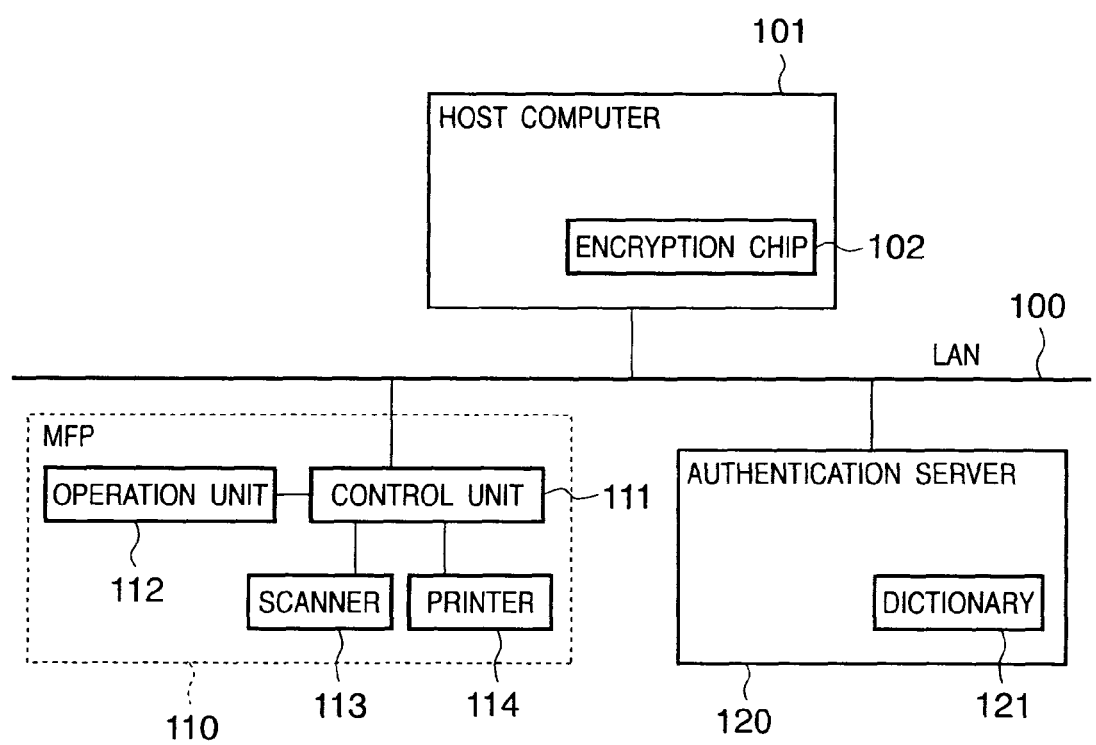
FIG. 1 is a block diagram showing the whole configuration of an image forming system according to an embodiment.

FIG. 1 is a block diagram showing the whole configuration of an image forming system according to the embodiment. As shown in FIG. 1, an image processing apparatus 110 has a scanner 113 as an image input device, a printer 114 as an image output device, a control unit 111, and an operation unit 112 as a user interface. The scanner 113, printer 114, and operation unit 112 are connected to the control unit 111, and controlled by instructions from the control unit 111. The control unit 111 is connected to a network transmitting means such as a local area network (LAN) 100.

The LAN 100 is also connected to a host computer 101 and authentication server 120 in addition to the image processing apparatus 110. As will be described later, the host computer 101 includes a Web browser and, on the basis of an HTML (Hyper Text Markup Language) file received from the image processing apparatus 110, acquires and displays information such as the status of the image processing apparatus. Also, the host computer 101 incorporates an encryption chip 102 (to be described later) which the host computer 101 uses to inquire of the authentication server 120 about files stored in the image processing apparatus 110 and operation levels capable of processing these files for each attribute. In addition, the authentication server 120 includes a dictionary 121 which defines the operation levels.

Figure 2:
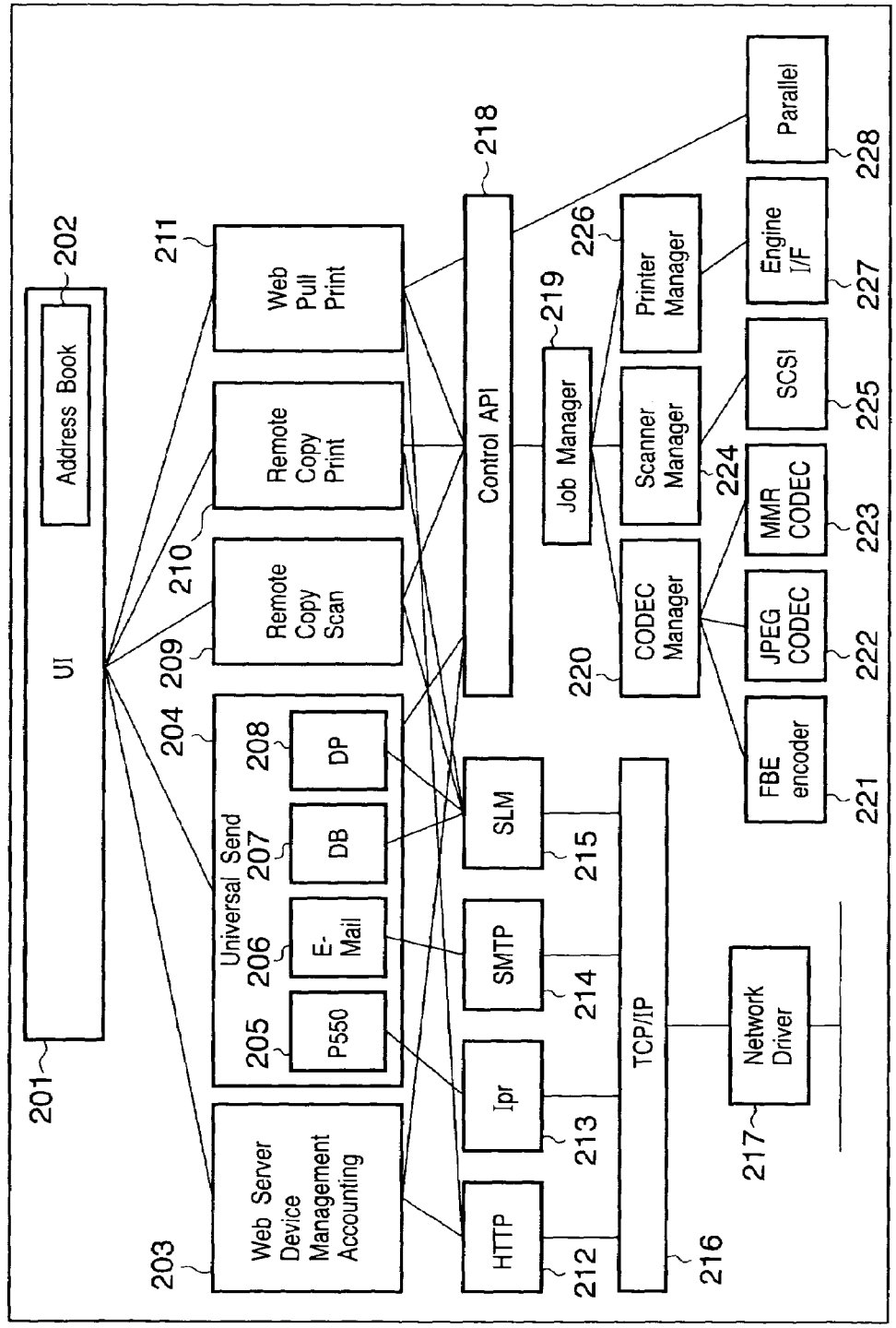
FIG. 2 is a block diagram showing the software configuration of an image processing apparatus.

FIG. 2 is a block diagram showing the software configuration of the image processing apparatus. Referring to FIG. 2, a user interface (to be referred to as "UI" hereinafter) module 201 interfaces the image processing apparatus with user operations when the operator performs various operations or settings on the image processing apparatus. This module transfers input information to various modules (to be described later) and requests them to process the information or perform data setting or the like, in accordance with an operator's operation.

An address book module 202 is a database module which manages the transmission destinations, communication destinations, and the like of data. Data managed by the address book module 202 is added, deleted, or acquired by an operation from the UI module 201. Also, the address book module 202 gives data transmission or communication information to each module (to be described later), in accordance with an operator's operation.

A Web server module 203 notifies image processing apparatus management information in response to a request from a Web client (e.g., the host computer 101). This management information is acquired via a universal send module 204, remote copy scan module 209, remote copy print module 210, and control API module 218, all of which will be described layer. The Web client is notified of the acquired management information via an HTTP module 212, TCP/IP communication module 216, and network driver 217, all of which will be described later.

The universal send module 204 controls distribution of data. That is, the universal send module 204 distributes data designated by the operator via the UI module 201 to communication (output) destinations designated in the same way. If the operator designates generation of distribution data by using a scanner function of this apparatus, the universal send module 204 operates the apparatus via the control API module 218 to generate the data.

A printer module 205 in the universal send module 204 is executed when a printer is designated as an output destination. An e-mail module 206 in the universal send module 204 is executed when an e-mail address is designated as a communication destination. A database module 207 in the universal send module 204 is executed when a database is designated as an output destination. A DP module 208 in the universal send module 204 is executed when an image processing apparatus analogous to this apparatus is designated as an output destination.

The remote copy scan module 209 reads image information by using the scanner function of the image processing apparatus, and outputs the read image information to another image processing apparatus connected by the network or the like, thereby performing the copy function realized by this image processing apparatus by using the other image processing apparatus.

The remote copy print module 210 outputs image information obtained by another image processing apparatus connected by the network or the like by using the printer function of this image processing apparatus, thereby performing the copy function realized by this image processing apparatus by using the other image processing apparatus.

A Web pull print module 211 loads information of various homepages on the Internet or on an intranet, and prints the loaded information.

The HTTP module 212 is used when the image processing apparatus performs HTTP communication. That is, the HTTP module 212 provides a communication function to the Web server module 203 or Web pull print module 211 by using the TCP/IP communication module 216.

An Ipr module 213 provides a communication function to the printer module 205 in the universal send module 204 by using the TCP/IP communication module 216.

An SMTP module 214 provides a communication function to the e-mail module 206 in the universal send module 204 by using the TCP/IP communication module 216.

An SLM (SaLutation Manager) module 215 provides a communication function to the database module 207 and DP module 208 in the universal send module 204, and to the remote copy scan module 209 and remote copy print module 210, by using the TCP/IP communication module 216.

The TCP/IP communication module 216 provides a network communication function to the various modules described above by using the network driver 217. The network driver 217 controls portions physically connected to the network.

The control API 218 provides an upstream module such as the universal send module 204 with an interface to a downstream module such as a job manager module 219 (to be described below). This reduces the dependence between the upstream and downstream modules, and increases the versatility of these modules.

The job manager module 219 interprets various processes designated from the various modules described above via the control API 218, and gives instructions to individual modules (220, 224, and 226) to be described below. Also, the job manager module 219 singly manages hardware processing executed in the image processing apparatus.

A codec manager module 220 manages and controls various data compression and expansion processes among other processes designated by the job manager module 219.

An FBE encoder module 221 compresses, by using an FBE format, data loaded by a scan process executed by the job manager module 219 or by a scan manager module 224 (to be described later).

A JPEC codec module 222 performs JPEG compression for loaded data and JPEG expansion for printing data, in a scan process executed by the job manager module 219 or scan manager module 224 or in a printing process executed by a print manager module 226.

An MMR codec module 223 performs MMR compression for loaded data and MMR expansion for printing data, in a scan process executed by the job manager module 219 or scan manager module 224 or in a printing process executed by the print manager module 226.

The scan manager module 224 manages and controls a scan process designated by the job manager module 219. A SCSI driver 225 controls communication between the scan manager module 224 and a scanner internally connected to the image processing apparatus.

The print manager module 226 manages and controls a printing process designated by the job manager module 219. An engine I/F module 227 provides an interface between the print manager module 226 and a printer.

A parallel port driver 228 provides an interface when the Web pull print module 211 outputs data to an output device (not shown) via a parallel port.

Figure 3:
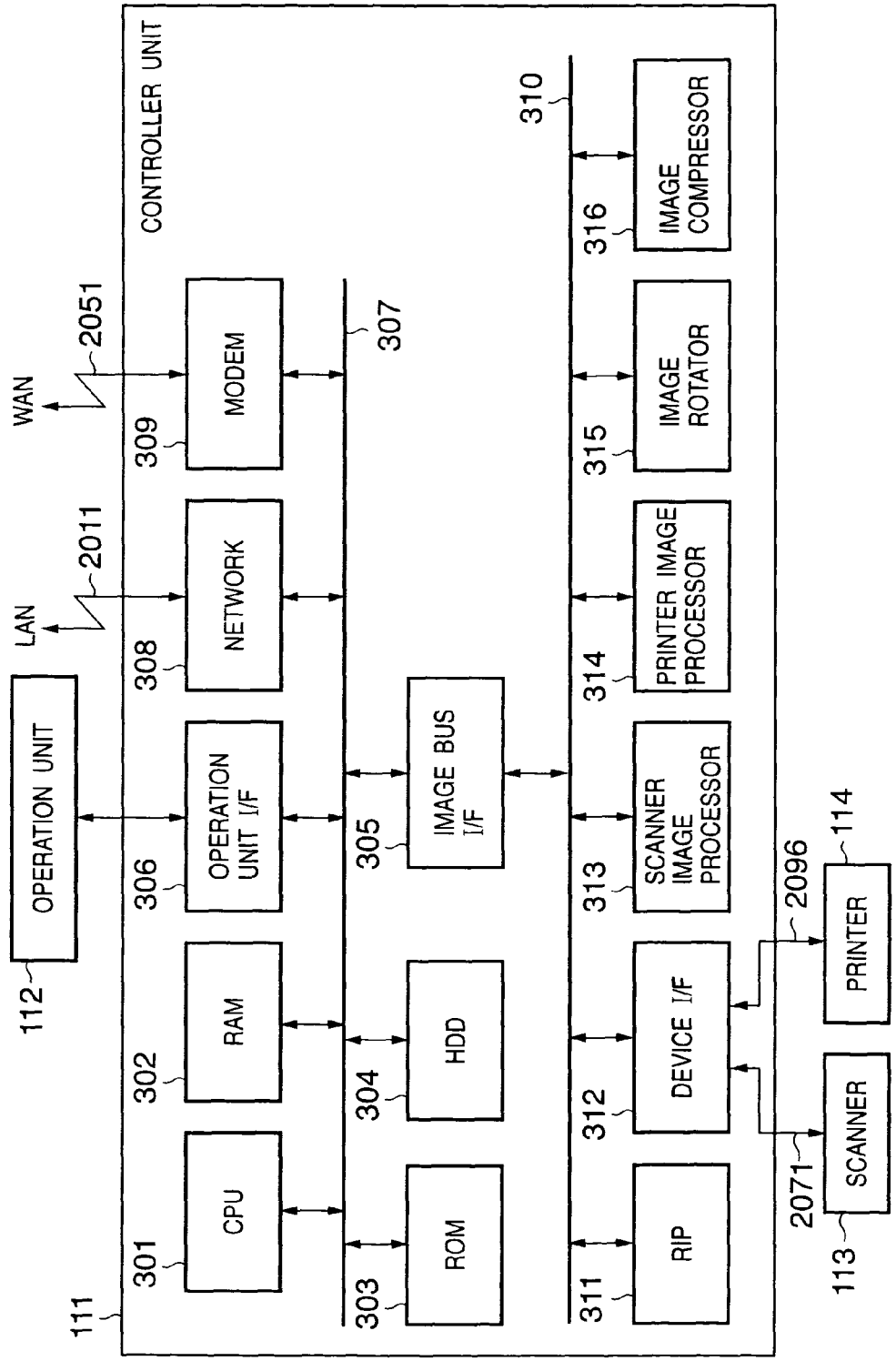
FIG. 3 is a block diagram showing details of the arrangement of the image processing apparatus.

FIG. 3 is a block diagram showing details of the arrangement of the image processing apparatus. As shown in FIG. 3, the control unit 111 is a controller connected to the scanner 113 as an image input device and the printer 114 as an image output device, and also connected to a LAN or a public line (WAN), thereby inputting and outputting image information and device information.

In the control unit 111, a CPU 301 is a controller for controlling the entire system. A RAM 302 is a system work memory which the CPU 301 uses to operate. The RAM 302 is also an image memory for temporarily storing image data. A ROM 303 is a boot ROM which stores a system boot program. An HDD 304 is a hard disk drive which stores system software, image data, files (to be described later), and the like.

An operation unit I/F 306 interfaces with the operation unit (UI) 112, and outputs image data to be displayed on the operation unit 112 to the operation unit 112. The operation unit I/F 306 also transmits to the CPU 301 information input by the user via the operation unit 112.

A network I/F 308 connects to the LAN 100, and inputs and outputs information from and to the LAN 100. A modem 309 connects to the public line, and inputs and outputs information from and to the public line. These devices described above are arranged on a system bus 307.

An image bus I/F 305 is a bus bridge which connects the system bus 307 to an image bus 310 which transfers image data at high speed, thereby converting a data structure. The image bus 310 is a PCI bus or IEEE1394.

The following devices are arranged on the image bus 310. A raster image processor (RIP) 311 rasterizes a PDL code transmitted from the network into an bit map image. A device I/F 312 connects the scanner 113 and printer 114 as image I/O devices to the control unit 111, and performs synchronous/asynchronous image data conversion.

A scanner image processor 313 corrects, processes, and edits input image data. A printer image processor 314 performs correction, resolution conversion, and the like of the printer with respect to image data to be printed out. An image rotator 315 rotates image data. An image compressor 316 performs JPEG compression/expansion for multilevel image data, and JBIG, MMR, or MH compression/expansion for binary image data.

Figure 4:
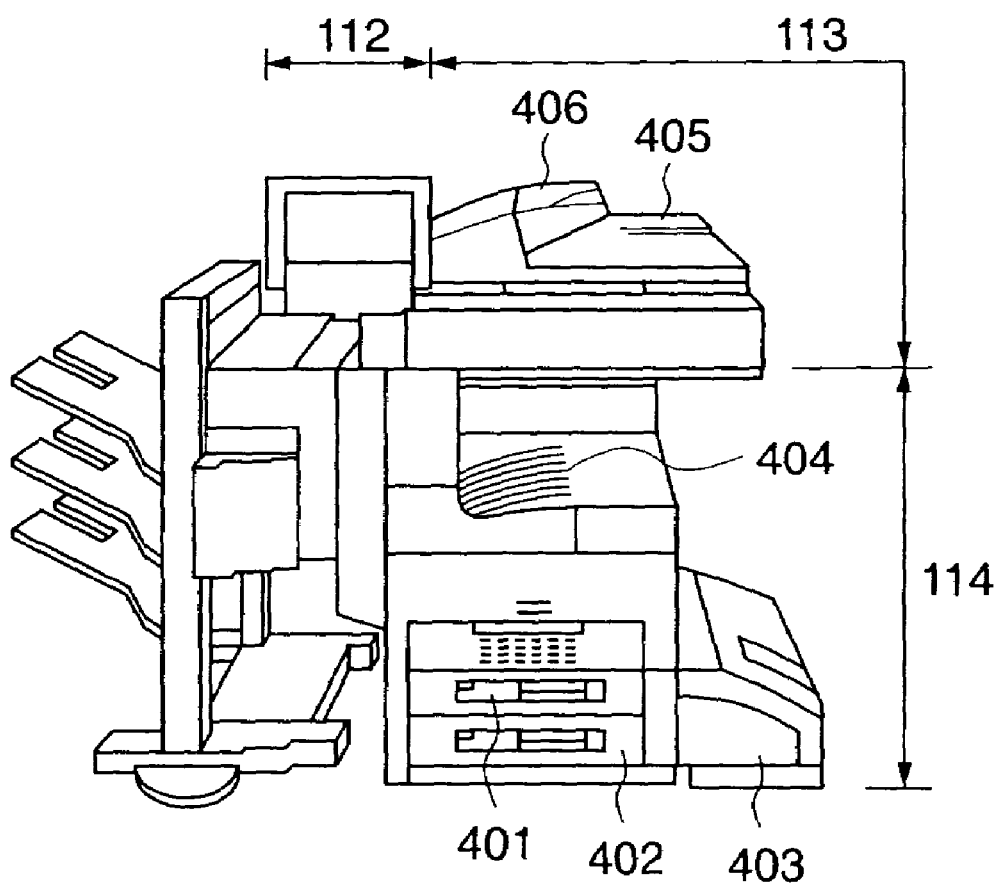
FIG. 4 is a view showing the external appearance of the image processing apparatus according to this embodiment.

FIG. 4 is a view showing the external appearance of the image processing apparatus of this embodiment. The scanner 113 as an image input device shown in FIG. 4 optically reads an image on an original by scanning the image by a CCD line sensor (not shown), and generates and outputs raster image data. When the user sets originals in a tray 406 of a document feeder 405 and designates activation of read on the operation unit 112, the controller CPU 301 gives an instruction 2071 to the scanner 113. Consequently, a feeder (not shown) feeds the originals one by one, and the scanner 113 reads an image on each original.

The printer 114 as an image output device prints raster image data on a sheet of paper. The system of printing can be either an electrophotographic system using a photosensitive drum or photosensitive belt, or an inkjet system by which an image is directly printed on a paper sheet by discharging ink from a micro nozzle array. Note that the printing operation is activated by an instruction 2096 from the controller CPU 301.

The printer 114 has a plurality of paper feed stages so that different sheet sizes or different sheet directions can be selected, and has corresponding sheet cassettes 401, 402, and 403. A paper delivery tray 404 receives printed sheets.

Figure 5:
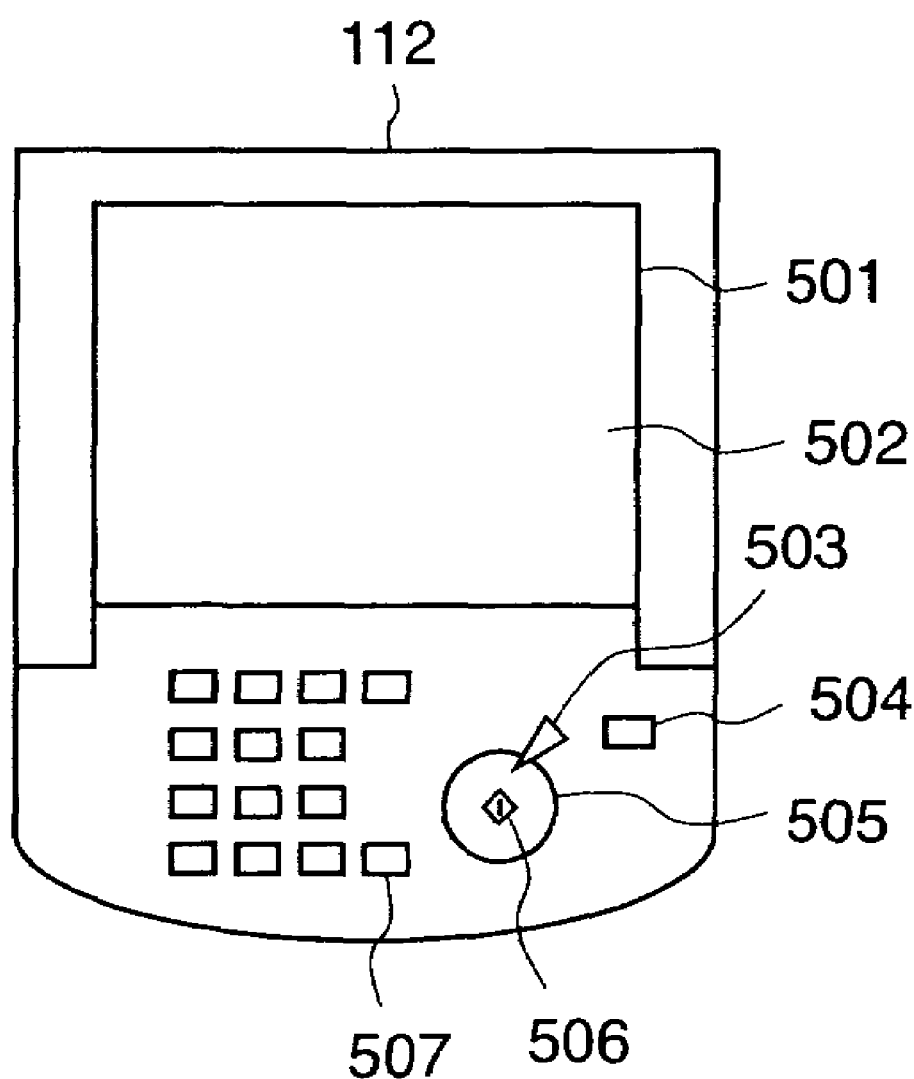
FIG. 5 is a view showing the arrangement of an operation unit 112 shown in FIG. 4.

FIG. 5 is a view showing the arrangement of the operation unit 112 shown in FIG. 4. As shown in FIG. 5, a touch panel sheet 502 is adhered on an LCD of an LCD unit 501, and a system operation window and soft keys are displayed. When a displayed key is touched, position information indicating the touched position is transmitted to the controller CPU 301.

A start key 505 shown in FIG. 5 is used to, e.g., start an operation of reading an original image. An LED indicator 506 having two colors, i.e., green and red, is formed in the central portion of the start key 505 to indicate in accordance with the color whether the start key 505 is usable. A stop key 503 is used to stop an operation currently being performed. An ID key 507 is used to input the user ID of a user. A reset key 504 is used to initialize settings from the operation unit.

Figure 6:
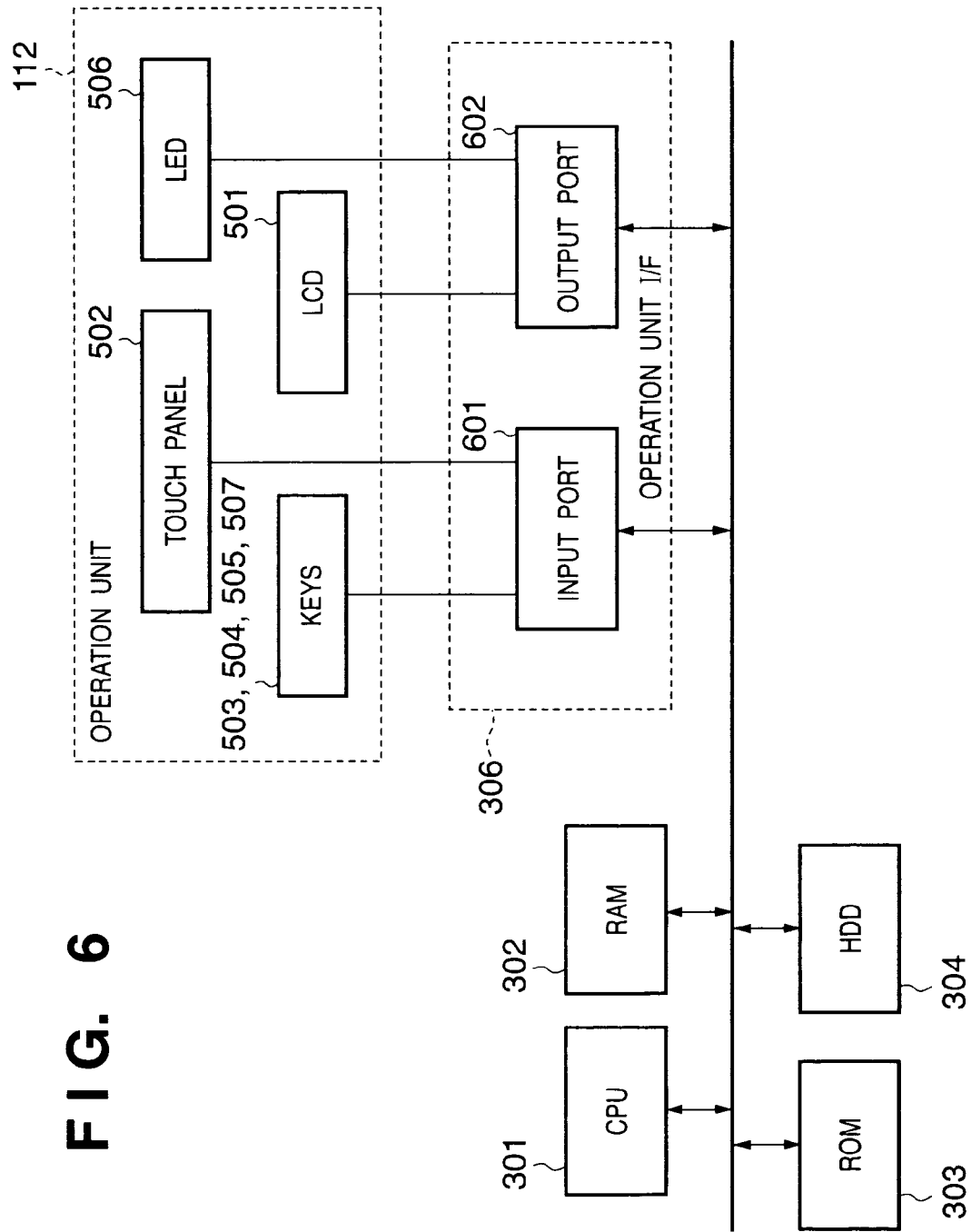
FIG. 6 is a block diagram showing details of the arrangement of the operation unit of the image processing apparatus shown in FIG. 3.

FIG. 6 is a block diagram showing details of the arrangement of the operation unit of the image processing apparatus shown in FIG. 3. As described earlier, the operation unit 112 is connected to the system bus 307 via the operation unit I/F 306. The system bus 307 is connected to the CPU 301, RAM 302, ROM 303, and HDD 304. The CPU 301 comprehensively controls access to the various devices connected to the system bus 307, on the basis of the control program and the like stored in the ROM 303 and HDD 304. Also, the CPU 301 loads input information from the scanner 113 connected via the device I/F 312, and outputs an image signal as output information to the printer 114 connected via the device I/F 312. The RAM 302 functions as a main memory, work area, and the like of the CPU 301.

Referring to FIG. 6, a user input from the touch panel 502 or the hard key 503, 504, 505, or 507 is transferred to the CPU 301 via an input port 601. On the basis of the contents of this user input and the control program, the CPU 301 generates display image data, and outputs the display image to the LCD unit 501 via an output port 602 for controlling a display image output device. The CPU 301 also controls the LED indicator 506 as needed.

A remote UI (remote user interface) as a characteristic function of this embodiment will be explained below.

This remote UI is a function of acquiring or setting information indicating the status or the like of the apparatus 110, or performing an operation such as printing or transmission (universal send), from an external apparatus. The user can use this remote UI function by using a Web browser or the like from the host computer 101 connected to the LAN 100.

As shown in FIG. 2, the Web server module 203 is operating in the apparatus 110 and makes HTTP (Hyper Text Transfer Protocol) communication possible. In the Web server module 203, a CGI (Common Gateway Interface) program activated by a request from the host computer (client) 101 can be operated. Resource files and page template files are stored in the HDD 304 shown in FIG. 3 and used by the remote UI. The resource files include HTML (Hyper Text Markup Language) files, image files, and the like used to display pages. The template files include files looked up by the CGI program and used to form pages.

To access the apparatus 110, the user directly inputs a URL (Uniform Resource Locator) indicating the address of a resource to the Web browser (client browser) of the host computer 101, or selects a link in which this URL is embedded. The client browser transmits an HTTP command which designates the URL input by the user to the apparatus 110 across the network. The Web server 203 of the apparatus 110 receives and analyzes this HTTP command, and performs an operation corresponding to the command.

If the request from the client browser is not a CGI program request, the designated one of the resources is transmitted to the client browser, and the process is terminated. If the request form the client browser is a CGI program request, the corresponding CGI program is activated. Upon activation, this CGI program can receive a query parameter, and the value designated from the browser by the user is transferred. In accordance with the request, the CGI program requests the apparatus 110 to perform an operation, e.g., acquire and set the apparatus information, or print out the data. Also, the CGI program forms a page to be transmitted by using a template file corresponding to the page. This template file contains a portion in which description is changed by using the acquired information. Therefore, a page having contents corresponding to the present status can be formed. On the other hand, the Web browser of the host computer 101 displays the page returned from the apparatus 110 on the screen.

As described above, by accessing the apparatus 110 from the Web browser of the host computer 101 by using the remote UI, it is possible to acquire and set the function, status, and held information of the apparatus 110, or operate the apparatus.

Figure 7:
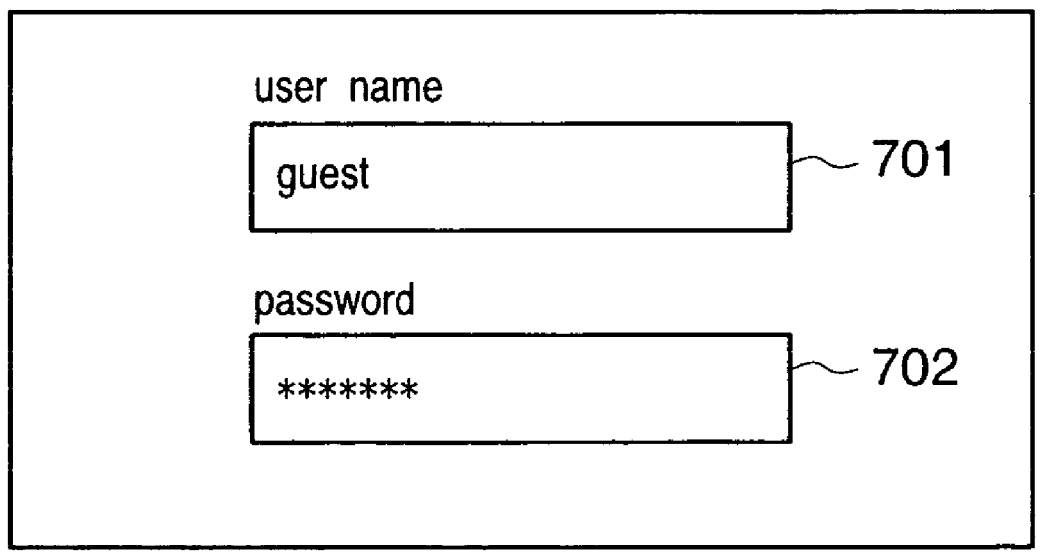
FIG. 7 is a view showing an image displayed when authentication to the image processing apparatus is performed.

From the point of view of security, however, when the user intends to access data in the image processing apparatus by using the remote UI, he or she must perform user authentication by using a user name 701 and password 702 shown in FIG. 7.

In this embodiment, the host computer 101 on the client side is requested to transmit the user name 701 and password 702, and authentication is performed by looking up a predetermined database in the HDD 304 of the image processing apparatus 110. Information which can be acquired and set by this remote UI includes, e.g., apparatus information such as usable paper sizes and the remaining amount, information of the activated job, document information stored in the storage device, address information such as e-main and FAX, and setting information concerning the network. Examples of operations which can be performed by the remote UI are print out of document information held in the image processing apparatus 110, browsing of the document information by the host computer 101, and save and transmission of the data.

The authorized user (or host computer 101) downloads, from the image processing apparatus 110, browsing software and add-on software for controlling the data access right in the image processing apparatus 110. First, the flow of processing pertaining to the browsing software will be described below. In this description, the flow of processing by the add-on software is also explained.

The flows of basic processes on the client (browser) side as the host computer 101 and on the HTTP server (to be simply referred to as a "server" hereinafter) side in the image processing apparatus 110 will be explained.

Figure 8:
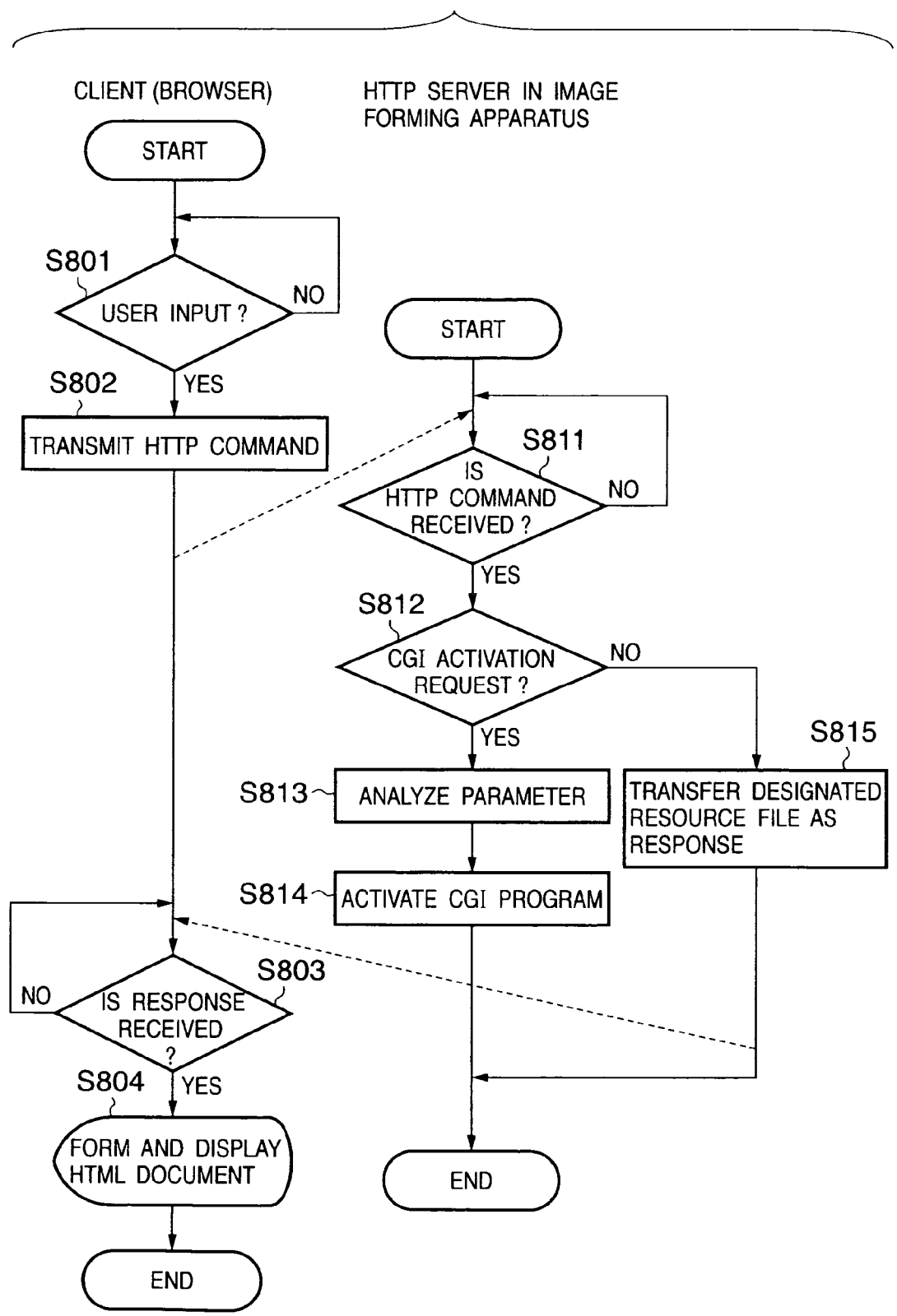
FIG. 8 is a flow chart showing the flows of basic processes on the client (browser) side and on the HTTP server side in the image processing apparatus.

FIG. 8 is a flow chart showing the flows of basic processes on the client (browser) side and on the HTTP server side in the image processing apparatus. First, in step S801, the client waits until the user inputs a URL. If a URL is input, the flow advances to step S802 to transmit an HTTP command to the server. In step S803, the client waits until a response from the server is received. If the response is received, the flow advances to step S804 to form and display an HTML document, and one session is complete. On the other hand, in step S811, the server waits until an HTTP command is received from the client (browser). If an HTTP command is received, the flow advances to step S812 to determine whether the command is a CGI activation request. If the command is a CGI activation request, the step advances to step S813 to analyze a CGI parameter. In step S814, the CGI program is activated, and one session is complete. If the command is not a CGI activation request in step S812, the flow advances to step S815 to return the designated resource file as a response, and one session is complete.

An operation when the user performs browsing, download, or the like for document information in the image processing apparatus 110 by using the remote UI while monitoring the browser display image of the client will be described below. Add-on software for controlling the access right to document information will be explained first, and then an authentication process performed by the add-on software will be explained.

Figure 9:
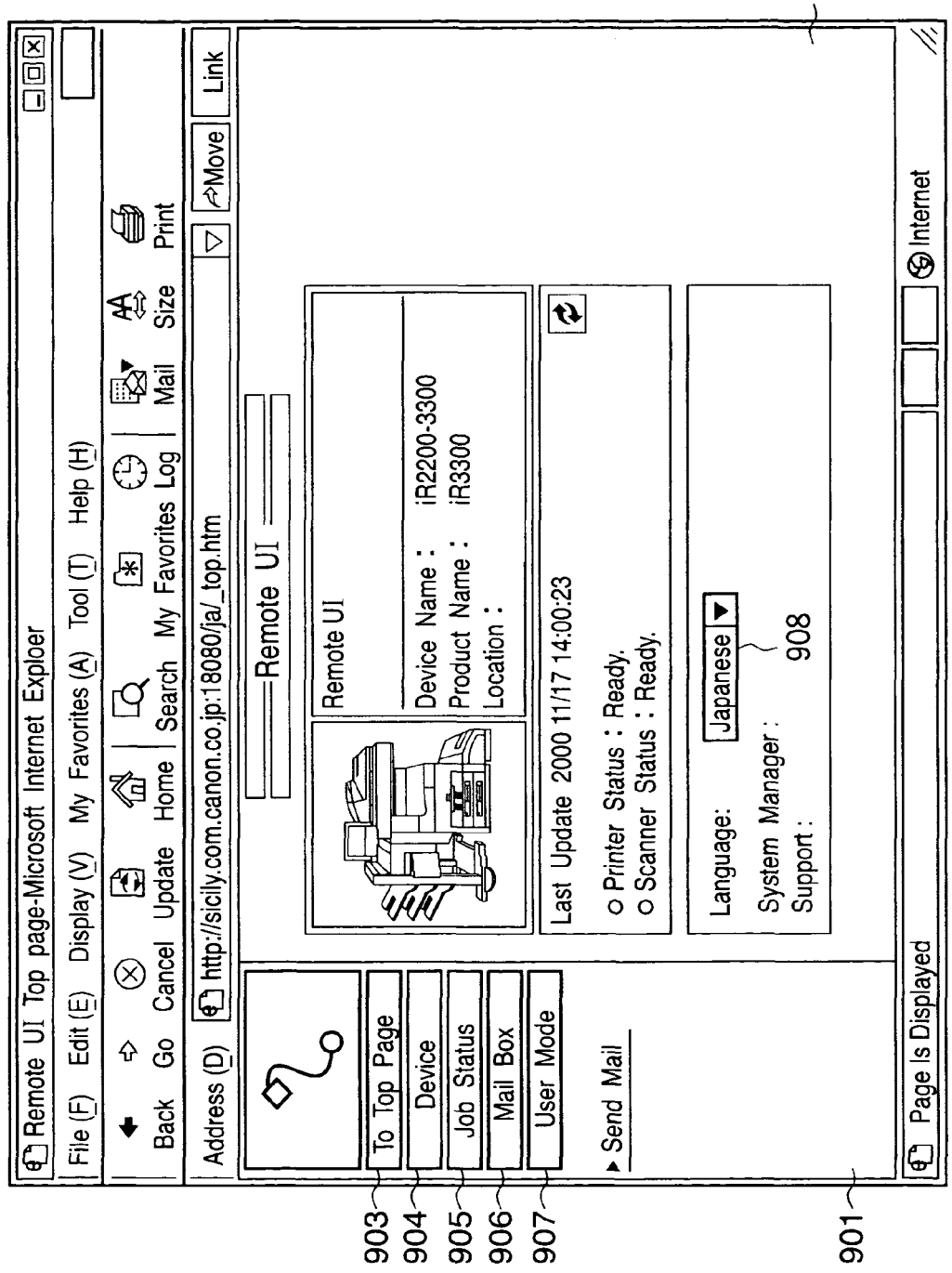
FIG. 9 is a view showing the top page image of a remote UI in this embodiment.
Figure 10:
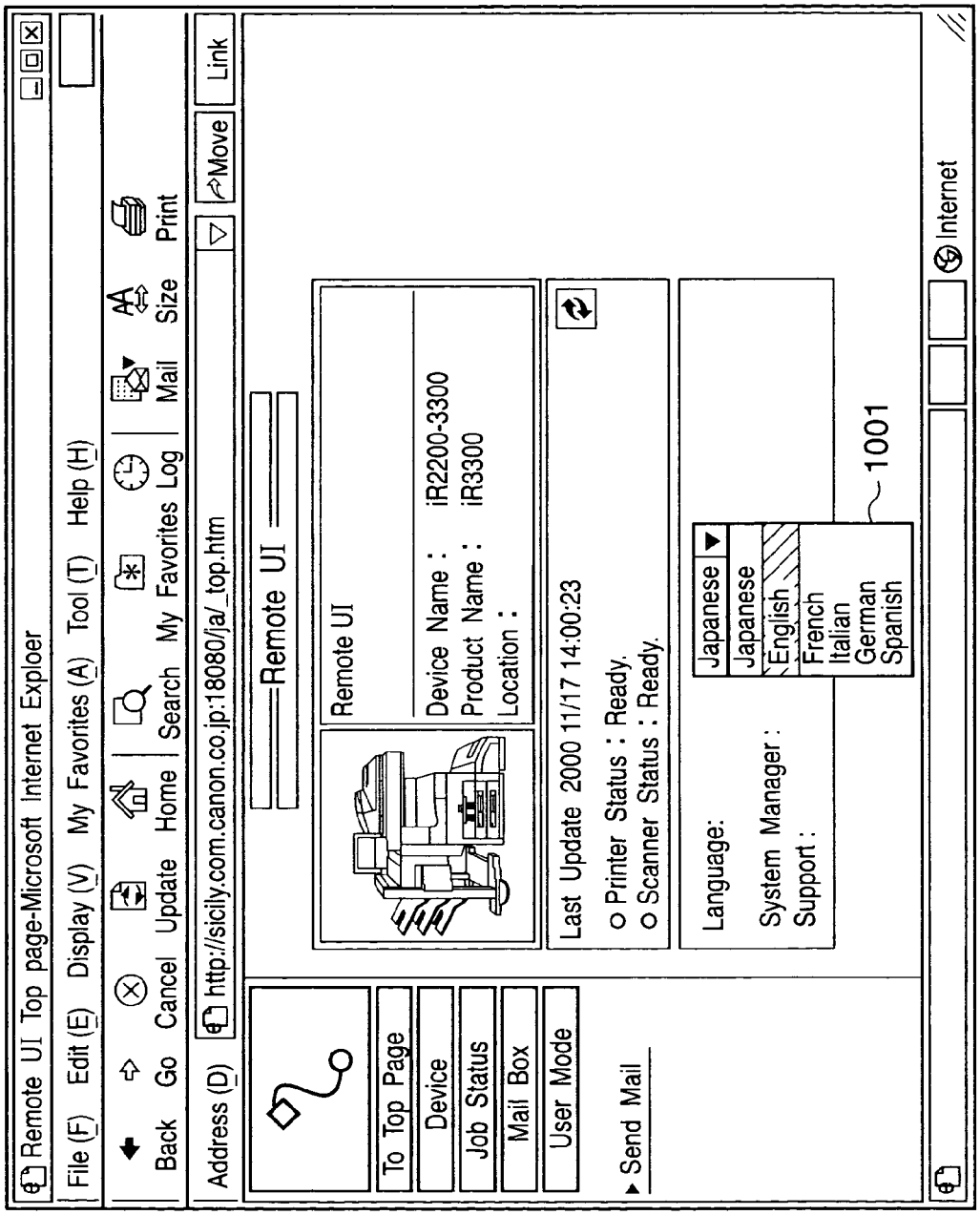
FIG. 10 is a view showing the displayed image of a display language switching pull-down menu 1001.

FIG. 9 is a view showing the top page image of the remote UI according to this embodiment. As shown in FIG. 9, this top page image is made up of two frames, i.e., an index area 901 and main area 902. The index area 901 displays a map of main sites. When the user touches a button on the map, a corresponding image is displayed in the main area 902. This top page is an image which displays general information of the apparatus 110. In addition, a device information page, job status page, box page, and user mode page are displayed when buttons (a device button 904, job status button 905, box button 906, and user mode button 907, respectively) arranged in the index area 901 are touched. Also, the top page is displayed when a button 903 for returning to the top page is touched on a page other than the top page. A display language switching pull-down menu button 908 is used to select a display language. When the display language switching pull-down menu button 908 is touched, a display language switching pull-down menu 1001 shown in FIG. 10 is displayed. When the user selects a language from the pull-down menu 1001, the top page is displayed in the selected language.

Figure 11:
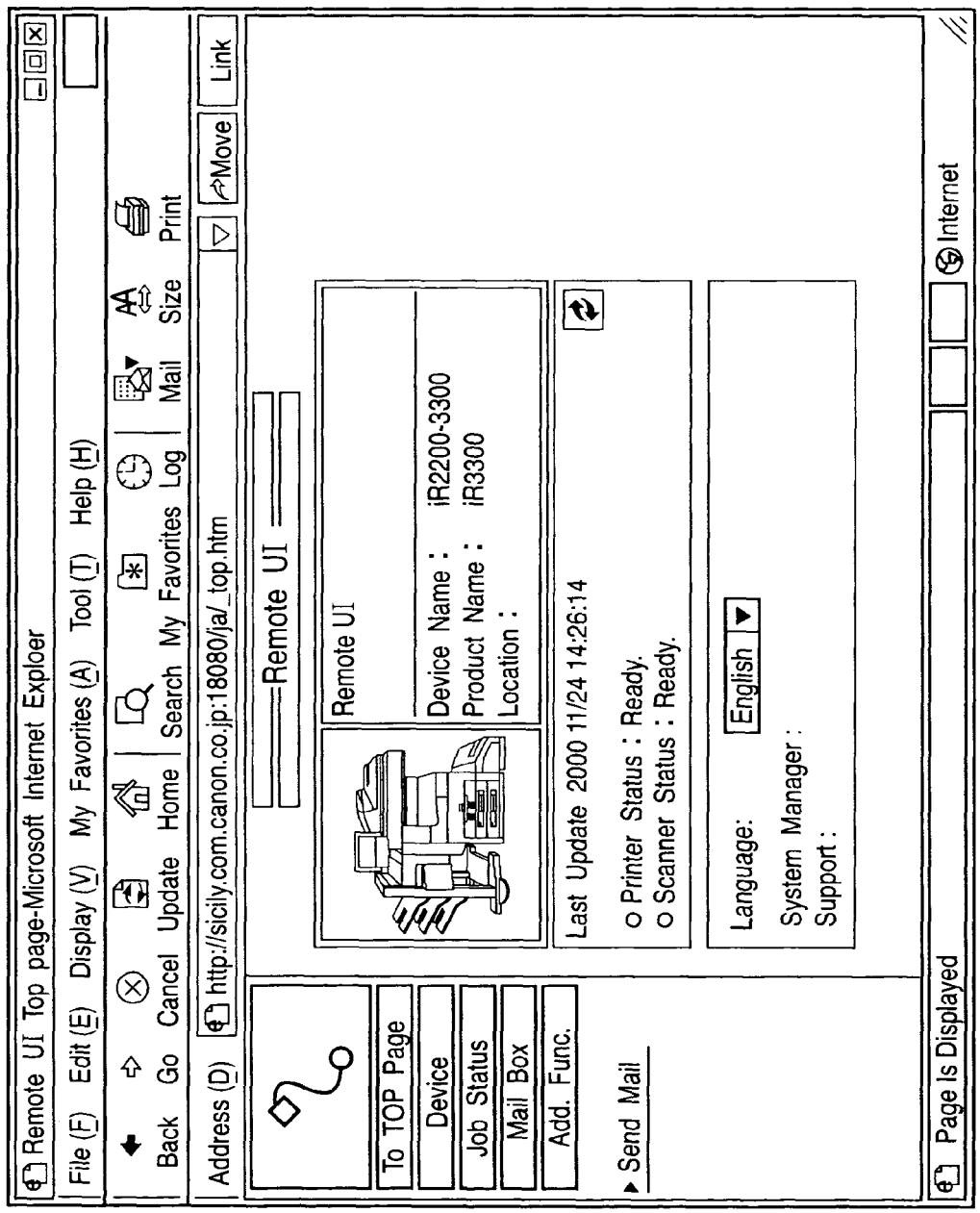
FIG. 11 is a view showing the top page image in English when English is chosen in the display language switching pull-down menu.

FIG. 11 is a view showing an English top page image when English is selected in the display language switching pull-down menu.

Next, add-on software for controlling the access right to data in the image processing apparatus 110 will be described. When the box 906 is chosen in the top page image (FIG. 9) of this remote UI, data stored in the image processing apparatus 110 as shown in FIG. 12 can be browsed. The browsing software is so configured that the user can check attribute information such as a folder name 1201 of a folder storing the file as shown in FIG. 12, a file name 1202, a file size 1203, and a file formation date 1204. The user can manipulate the file by a mouse (not shown) or keyboard (not shown) attached to the host computer 101 by using the remote UI.

In the example shown in FIG. 12, when the user selects "Suzuki" in the folder 1201, he or she can browse the attributes (1202 to 1204) of the file stored in the folder. The attributes of a file name 1205 cannot be checked. The procedure of file manipulation will be explained below by taking a browsable file 1206 as an example.

Note that the attributes explained below of even the file 1205 whose file name cannot be browsed can be checked by selecting this file and executing one of the operations explained below.

As the operation procedure, the file 1206 shown in FIG. 12 will be taken as an example, and operations performed for the file 1206 will be explained.

Figure 13:
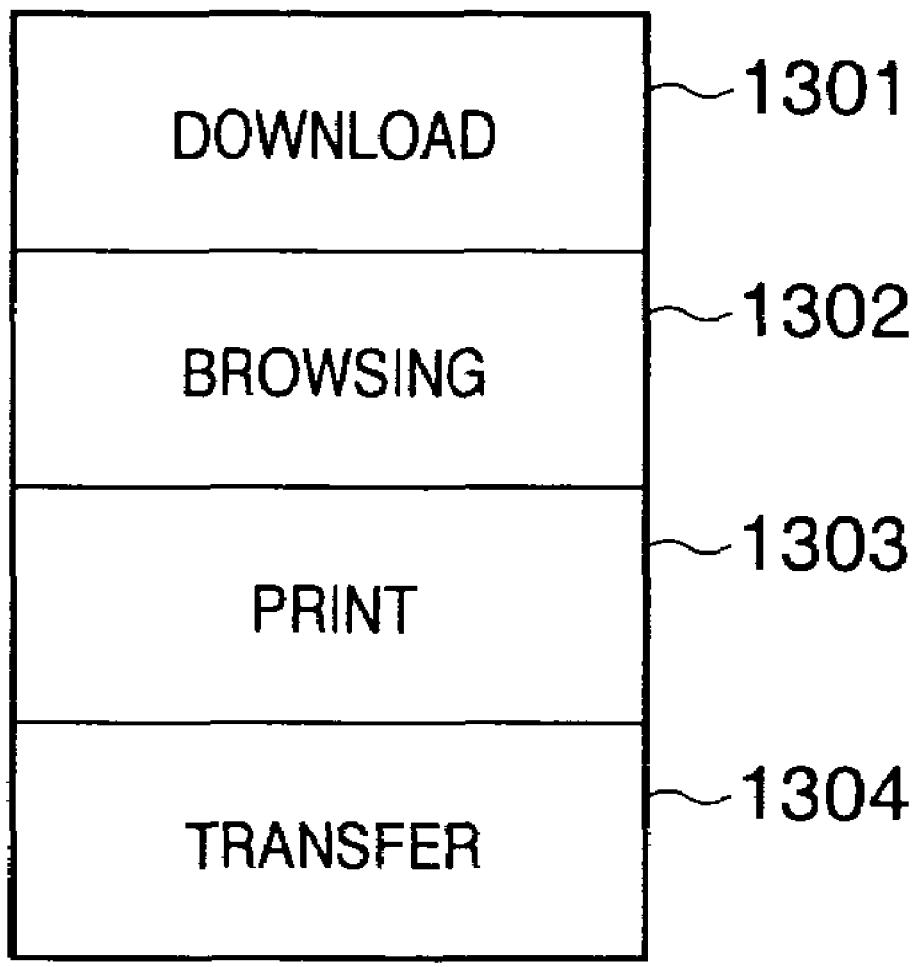
FIG. 13 is a view showing operations which can be performed for files.

First, when the file 1206 is selected, file download 1301, browsing 1302, print 1303, and transfer 1304 as shown in FIG. 13 are displayed.

These operations will be described by taking download 1301 as a representative example. However, the flow of operation for any other attribute is basically the same as download 1301.

[Download]

Figure 14:
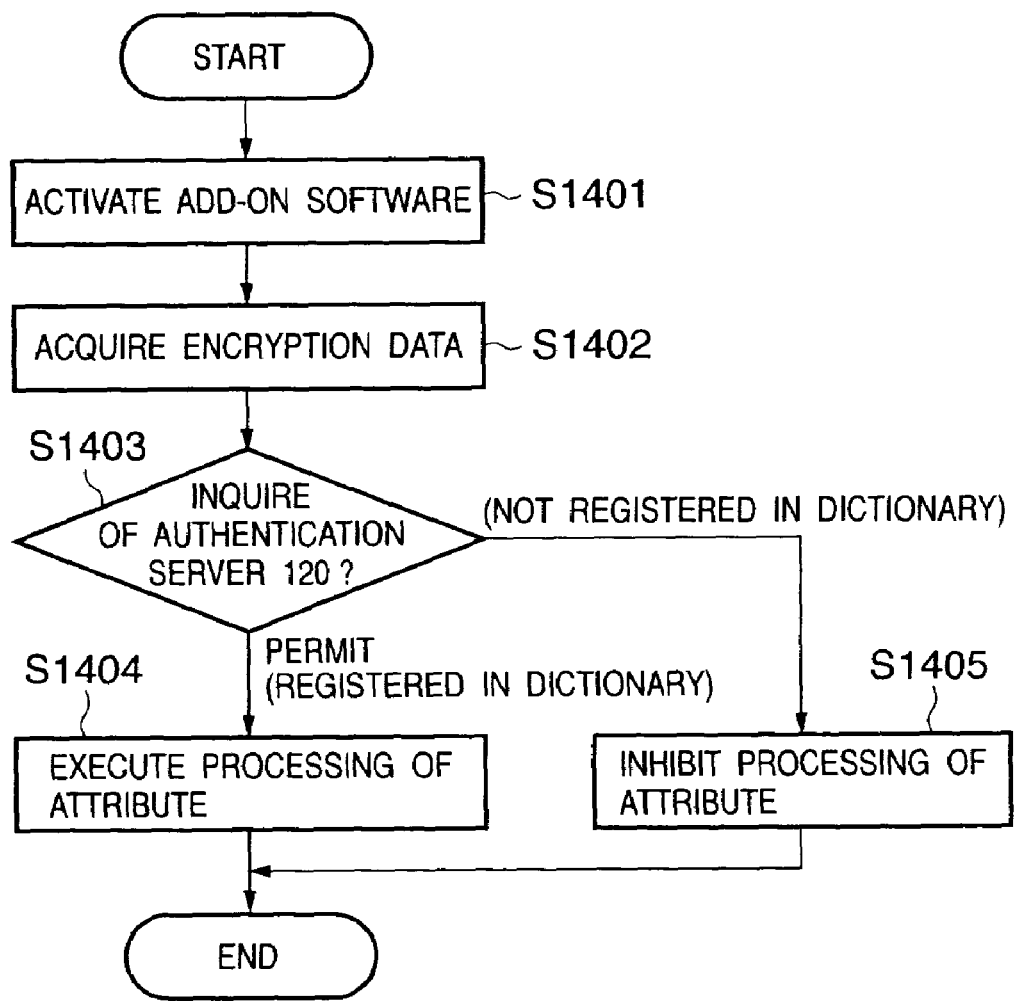
FIG. 14 is a flow chart showing the flow of processing performed by add-on software in this embodiment.

When download 1301 is selected, add-on software downloaded to the host computer 101 simultaneously with browsing software is automatically executed. FIG. 14 shows processing performed by this automatically executed add-on software according to this embodiment.

First, in step S1401, the add-on software is activated. In step S1402, encryption data stored in the encryption chip 102 incorporated into the host computer 101 is read out. The encryption chip 102 is, .g., an IC chip to which a PCMCIA card can be attached as an I/F. In step S1403, the acquired encryption code is used to inquire of the authentication server 120, which is the destination indicated by an IP address which the add-on software has in advance, about the operation level of the selected file 1206. The authentication server 120 has the dictionary 121 defining files stored in the image processing apparatus 110 and operation levels capable of processing these files for each attribute. The authentication server 120 determines whether the attribute is registered in the dictionary 121. If the attribute (in this example, download 1301) selected by the remote UI displayed on the host computer 101 is registered, the flow advances to step S1404 to start the processing (download of the file 1206) of this attribute. If the attribute which the user who has accessed is to be permitted to use is not registered in the dictionary 121, the flow advances to step S1405 to inhibit the processing (download of the file 1206) of the attribute. It is also possible to form a message indicating that the user who has accessed is inhibited to use the processing (download of the file 1206) of the attribute, and transmit the message to the client's browser.

Figure 15:
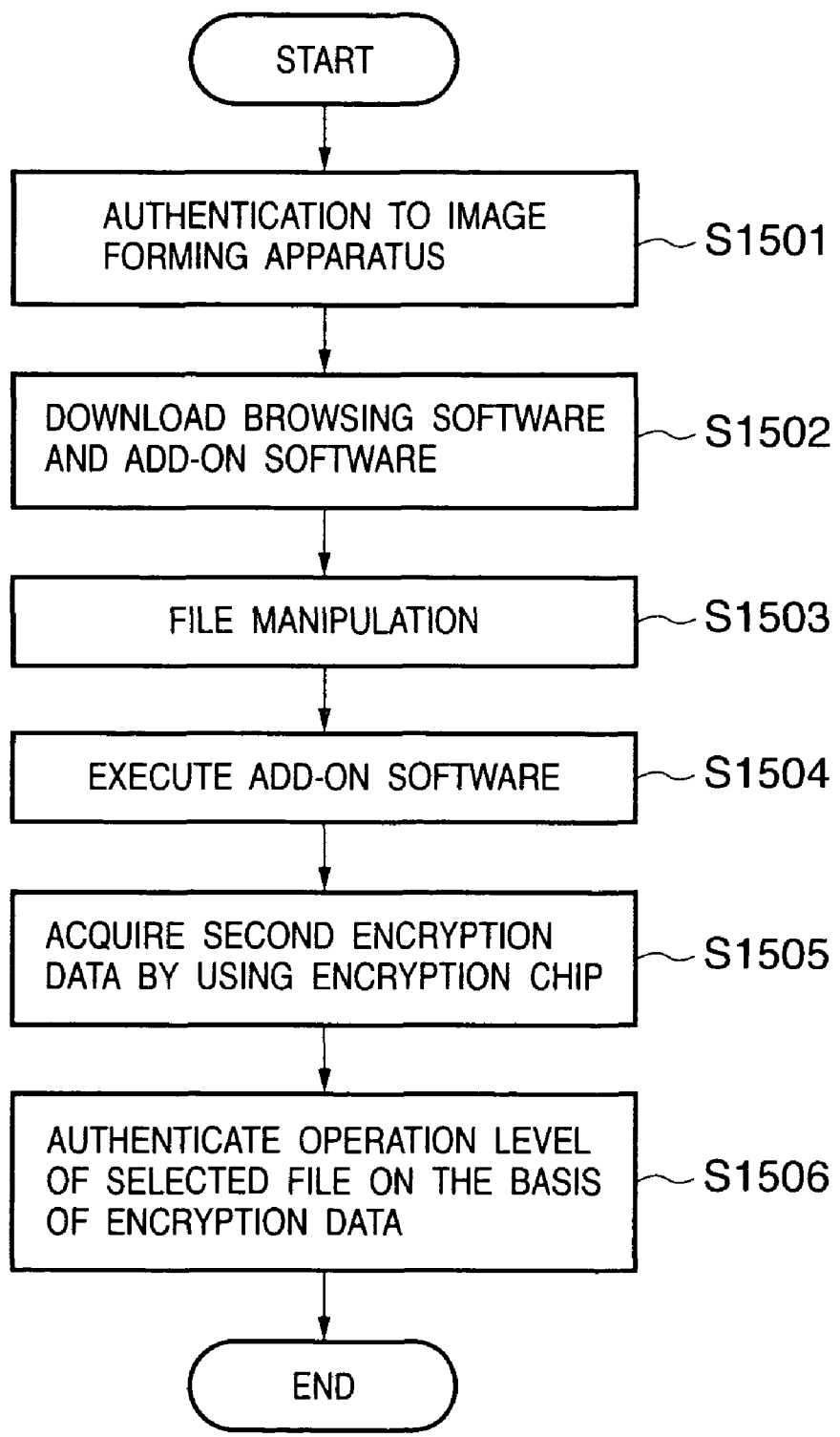
FIG. 15 is a flow chart showing the flow of an authentication process by which the security is strengthened.

FIG. 15 shows the flow of an authentication process by which the security is strengthened according to this embodiment explained above. Assume that the user wants to print out a file held in the image processing apparatus 110, browse the file on the host computer 101, or save or transmit the data, from the host computer 101 by using the remote UI. In step S1501, the user inputs the user name 701 and password 702 shown in FIG. 7 to perform authentication to the image processing apparatus 110. If this authentication is permitted, the flow advances to step S1502 to download the browsing software and add-on software described above from the image processing apparatus 110. Also, the top page image of the remote UI shown in FIG. 9 is displayed in the Web browser of the host computer 101. When the box button 906 in the index area 901 is selected, the browsing software is activated to display the file manipulation image as shown in FIG. 12.

If the file 1206 shown in FIG. 12 is selected, for example, the above-mentioned add-on software is activated in step S1504, and encryption data stored in the encryption chip 102 incorporated into the host computer 101 is acquired in step S1505. In step S1506, the acquired encryption data is used to inquire of the authentication server 120 about authentication of the attribute level with respect to the file 1206 selected by the user. After that, this authentication process is terminated.

In this embodiment, the authentication server 120 performs the authentication process for each attribute of data to be browsed stored in the image processing apparatus 110. However, this authentication process may also be performed by the image processing apparatus 110 itself or the host computer 101 itself. Alternatively, another image processing apparatus connected to the network or the like can perform the authentication process.

In the embodiment, the add-on software is used to authenticate each attribute of data to be browsed stored in the image processing apparatus 110, and the IP address of the authentication server 120 for performing authentication is downloaded from the image processing apparatus 110 together with the add-on software in advance. However, it is also possible to reinquire of the image processing apparatus 110 about information indicative of the presence of the authentication server 120.

Furthermore, each attribute of data to be browsed stored in the image processing apparatus 110 is authenticated on the basis of the dictionary 121 held by the authentication server 120. However, the dictionary 121 need not be held in the authentication server 120, and the authentication server 120 may also have information indicating the location of a second authentication server having the dictionary 121.

In this embodiment as has been described above, an image processing apparatus does not exclusively control the security of a remote UI by which the image processing apparatus is operated from a remote place, but authentication is checked on the basis of downloaded add-on software and an encryption chip in a host computer, thereby increasing the security level. Also, this authentication is performed by an authentication server in accordance with an instruction from the add-on software, by acquiring encryption data and using this encryption data and a dictionary describing authentication levels. This further increases the secrecy.

Furthermore, since the encryption chip is a detachable IC chip such as a PCMCIA card, it is possible to utilize various host computers.

The present invention can be applied to a system constituted by a plurality of devices (e.g., a host computer, interface, reader, and printer) or to an apparatus (e.g., a copying machine or facsimile apparatus) comprising a single device.

Further, the object of the present invention can also be achieved by supplying a recording medium recording the program code of software for implementing the functions of the above embodiment to a system or apparatus, and reading out and executing the program code stored in the recording medium by a computer (or a CPU or MPU) of the system or apparatus.

In this case, the program code read out from the recording medium implements the functions of the embodiment, and the recording medium recording this program code constitutes the invention.

As this recording medium for supplying the program code, it is possible to use, e.g., a floppy (registered trademark) disk, hard disk, optical disk, magnetooptical disk, CD-ROM, CD-R, magnetic tape, nonvolatile memory card, and ROM.

Furthermore, besides the functions of the above embodiment are implemented by executing the readout program code by the computer, the present invention includes a case where an OS (Operating System) or the like running on the computer performs part or the whole of actual processing in accordance with instructions by the program code and thereby implements the functions of the embodiment.

Furthermore, the present invention also includes a case where the program code read out from the recording medium is written in a memory of a function expansion board inserted into the computer or of a function expansion unit connected to the computer, and, in accordance with instructions by the program code, a CPU or the like of the function expansion board or function expansion unit performs part or the whole of actual processing and thereby implements the functions of the above embodiment.

As has been described above, the embodiment of the present invention can strengthen the security when a host computer connected to a network is to remotely control information in an image processing apparatus.

As many apparently widely different embodiments of the present invention can be made without departing from the spirit and scope thereof, it is to be understood that the invention is not limited to the specific embodiments thereof except as defined in the appended claims.

What is claimed is:

1. A remote operation method of an information processing apparatus connected to an authentication apparatus and an image processing apparatus via a network, the method comprising:

accessing the image processing apparatus;

receiving, from the image processing apparatus, remote-operating software for the information processing apparatus to remotely operate the image processing apparatus and data specifying the authentication apparatus, which authenticates an operation level of a remote operation, as a response to the accessing;

issuing a request for an authentication process to the authentication apparatus based on the data received, if an instruction to operate remotely the image processing apparatus is input by a user, wherein the authentication process authenticates an operation level of the remote operation performed by the information processing apparatus; and remotely operating the image processing apparatus using the remote-operating software, wherein the remote operation is executed by the remote-operating software and is permitted by the operation level authenticated in the authentication process among two or more remote operations, wherein the data received includes add-on software, and the information processing apparatus requests the authentication apparatus to execute the authentication process by the add-on software, wherein the requested authentication process is performed using codes and a dictionary that defines operation levels with respect to the image processing apparatus, and wherein the dictionary is contained in the authentication apparatus on the network.

2. The method according to claim 1, wherein the data is an address of the authentication apparatus on the network.

3. The method according to claim 1, wherein the remote operation is at least one of: a download operation, a browsing operation, a printing operation, and a transfer operation.

4. An image processing system comprising:

a host computer, an authentication apparatus, and an image processing apparatus connected to a network, wherein the host computer is configured to access the image processing apparatus, wherein the image processing apparatus is configured to transmit remote-operating software for the information processing apparatus to remotely operate the image processing apparatus and data specifying the authentication apparatus, which authenticates an operation level of a remote operation, to the host computer, in response to the access from the information processing apparatus, wherein the host computer is configured to issue a request for an authentication process to the authentication apparatus based on the data transmitted by the image processing apparatus, if an instruction to operate remotely the image processing apparatus is input by a user, wherein the authentication apparatus is configured to authenticate an operation level of the remote operation performed by the host computer, in response to the request, wherein the host computer is configured to remotely operate the image processing apparatus using the remote-operating software, wherein the remote operation is executed by the remote-operating software and is permitted by the operation level authenticated by the authentication apparatus among two or more remote operations, wherein the data transmitted includes add-on software, and the information processing apparatus requests the authentication apparatus to execute the authentication process by the add-on software, wherein the requested authentication process is performed using codes and a dictionary that defines operation levels with respect to the image processing apparatus, and wherein the dictionary is contained in the authentication apparatus.

5. A computer-readable recording medium storing a program for causing a computer to execute a remote operation method of an information processing apparatus connected to an authentication apparatus and an image processing apparatus via a network, the method comprising:

accessing the image processing apparatus;

receiving, from the image processing apparatus, remote-operating software for the information processing apparatus to remotely operate the image-processing apparatus and data specifying the authentication apparatus, which authenticates an operation level of a remote operation, as a response to the accessing;

issuing a request for an authentication process to the authentication apparatus based on the data received, if an instruction to operate remotely the image processing apparatus is input by a user, wherein the authentication process authenticates an operation level of the remote operation performed by the information processing apparatus; and remotely operating the image processing apparatus using the remote-operating software, wherein the remote operation is executed by the remote-operating software and is permitted by the operation level authenticated in the authentication process among two or more remote operations, wherein the data received includes add-on software, and the information processing apparatus requests the authentication apparatus to execute the authentication process by the add-on software, wherein the requested authentication process is performed using codes and a dictionary that defines operation levels with respect to the image processing apparatus, and wherein the dictionary is contained in the authentication apparatus on the network.

6. An information processing apparatus connected to an authentication apparatus and an image processing apparatus via a network, the apparatus comprising:

an accessing unit configured to access the image processing apparatus;

a reception unit configured to receive, from the image processing apparatus, remote-operating software for the information processing apparatus to remotely operate the image processing apparatus and data specifying the authentication apparatus, which authenticates an operation level of a remote operation, as a response to accessing by the accessing unit;

a request unit configured to issue a request for an authentication process to the authentication apparatus based on the data received by the reception unit, if an instruction to operate remotely the image processing apparatus is input by a user, wherein the authentication process authenticates an operation level of the remote operation performed by the information processing apparatus;

a remote operation unit configured to remotely operate the image processing apparatus using the remote-operating software, wherein the remote operation is executed by the remote-operating software and is permitted by the operation level authenticated in the authentication process among two or more remote operations, wherein the data received includes add-on software, and the information processing apparatus requests the authentication apparatus to execute the authentication process by the add-on software, wherein the requested authentication process is performed using codes and a dictionary that defines operation levels with respect to the image processing apparatus, and wherein the dictionary is contained in the authentication apparatus on the network.

* * * * *